United States Patent
Lehmann et al.

(10) Patent No.: US 7,806,242 B2
(45) Date of Patent: Oct. 5, 2010

(54) MAGNETIC RAIL BRAKE DEVICE

(75) Inventors: Henry Lehmann, Hinterbrühl (AT); Hermann Koidl, Vienna (AT); Lothar Schmied, Mödling (AT); Richard Rathammer, Grub (AT); Stefan Haas, Mödling (AT)

(73) Assignee: Knorr-Bremse Systeme fur Schienenfahrzeuge GmbH, Munich (DE)

( * ) Notice: Subject to any disclaimer, the term of this patent is extended or adjusted under 35 U.S.C. 154(b) by 451 days.

(21) Appl. No.: 11/578,245

(22) PCT Filed: Apr. 13, 2005

(86) PCT No.: PCT/EP2005/003883

§ 371 (c)(1),
(2), (4) Date: Jul. 18, 2007

(87) PCT Pub. No.: WO2005/100121

PCT Pub. Date: Oct. 27, 2005

(65) Prior Publication Data

US 2007/0284199 A1    Dec. 13, 2007

(30) Foreign Application Priority Data

Apr. 14, 2004    (DE) .................. 10 2004 018 010

(51) Int. Cl.
*B60L 7/00*    (2006.01)
(52) U.S. Cl. ..................................... 188/165
(58) Field of Classification Search ................. 188/165, 188/161, 163, 50–55
See application file for complete search history.

(56) References Cited

U.S. PATENT DOCUMENTS

| | | | |
|---|---|---|---|
| 2,564,945 A | 8/1951 | Zuckermann | |
| 4,144,954 A * | 3/1979 | Farello et al. | 188/165 |
| 6,769,517 B2 * | 8/2004 | Schmied et al. | 188/165 |
| 6,953,107 B2 | 10/2005 | Lehmann et al. | |
| 2004/0079597 A1 | 4/2004 | Schmied et al. | |
| 2006/0278478 A1 * | 12/2006 | Pribonic et al. | 188/165 |

FOREIGN PATENT DOCUMENTS

| | | |
|---|---|---|
| DE | 196 19 409 A1 | 11/1997 |
| DE | 100 09 270 A1 | 9/2001 |
| DE | 101 11 685 A1 | 9/2002 |
| GB | 26295 | 1/1913 |
| SU | 1017566 | 5/1983 |

OTHER PUBLICATIONS

"Grundlagen der Bremstechnik" [Fundamentals In Braking Technology], 2003, pp. 92-97 by Knorr-Bremse AG, Munich.

* cited by examiner

*Primary Examiner*—Melanie Torres Williams
(74) *Attorney, Agent, or Firm*—Barnes & Thornburg LLP

(57) ABSTRACT

A magnetic rail brake device of a rail vehicle comprises at least one braking magnet including a magnet coil body having a plurality of magnetic elements held thereon, and which magnetic elements are movable. The device also comprises at least one fixing strip running parallel to a longitudinal length of the magnetic coil body and directly connected to the magnetic coil body to fix the braking magnet to other components of the magnetic rail brake device.

6 Claims, 2 Drawing Sheets

MAGNETIC RAIL BRAKE DEVICE

BACKGROUND AND SUMMARY

The present disclosure relates to a magnetic rail brake device of a rail vehicle including at least one braking magnet. The at least one braking magnet includes a magnet coil body, on which a plurality of magnetic magnet elements are held such that they can move. Also included is at least one fixing strip, which runs parallel to the longitudinal extent of the magnet coil body and is directly connected to said magnet coil body, for the purpose of fixing the braking magnet to further components of the magnetic rail brake device.

A magnetic rail brake is described, for example, in DE 101 11 685 A1. The force-generating main component of an electrical magnetic rail brake is the braking magnet. In principle, it is an electromagnet, comprising a magnet coil extending in the rail direction and a magnet core, which is similar to a horseshoe and forms the base or carrier body. The direct current flowing in the magnet coil brings about a magnetic voltage, which induces a magnetic flux in the magnet core, which magnetic flux is short-circuited via the rail head as soon as the braking magnet rests on the rail. As a result, a magnetic attraction force is brought about between the braking magnet and the rail. Owing to the kinetic energy of the moving rail vehicle, the magnetic rail brake is pulled along the rail via drivers. In this case, a braking force is produced owing to the sliding friction between the braking magnet and the rail in conjunction with the magnetic attraction force. The extent of the braking force of a magnetic rail brake is dependent, inter alia, on the reluctance of the magnetic circuit, i.e. the geometry and permeability, the current linkage, the friction value between the braking magnet and the rail and the rail state.

In relation to the embodiments of magnetic rail brakes, reference is also made to the publication "Grundlagen der Bremstechnik" [Fundamentals in braking technology], pages 92 to 97 by Knorr-Bremse AG, Munich, 2003.

In principle, it is possible to distinguish between two different types of magnets in terms of their structural design. In a first embodiment, the braking magnet is a rigid magnet, to which two wearing strips are screwed which are separated by a nonmagnetic strip in the longitudinal direction. This serves the purpose of avoiding a magnetic short circuit within the braking magnet. Rigid magnets are usually used for local transport in streetcar systems and city railroads.

Furthermore, generic link magnets are known, in the case of which the magnet coil body does not have a continuous, rigid steel core, but has open chambers split off between the steel cores merely by partition walls. Magnet elements are inserted into the individual chambers and can move during the braking process. It is thus possible for them to follow uneven sections on the rail head. Link magnets are used as standard in the standard-gage railroad sector. In the case of known link magnets, at least one fixing strip, which runs parallel to the longitudinal extent of the magnet coil body and is directly connected to said magnet coil body, can be provided for the purpose of fixing the braking magnet to further components of the magnetic rail brake device, such as to track holders or to flanges of actuating cylinders, for example. In this case, the track holders or flanges of the actuating cylinders may result in magnetic short circuits, which disadvantageously reduce the holding force of the link magnets on the rail.

In contrast, the present disclosure relates to a magnetic rail brake device such that it produces a braking power which is as high as possible given a simple design and with low manufacturing costs.

The magnetic rail brake device of the present disclosure comprises a fixing strip that includes a diamagnetic or paramagnetic material.

A diamagnetic material is generally understood to be a material whose relative permeability is less than 1 and which weakens the magnetic field. Such a material may be, for example, silver or copper. Paramagnetic materials have a relative permeability of slightly greater than 1 and increase the magnetic field slightly. Such a material may be, for example, aluminum, platinum or air. In terms of their effect on the magnetic field, these materials differ markedly from ferromagnetic materials such as iron, cobalt, nickel, for example, which considerably intensify the magnetic field.

Owing to the fact that the present disclosure provides for the fixing strip to include a diamagnetic or paramagnetic material, this causes the magnetic field to be weakened or only slightly intensified, with the result that the magnetic stray flux on the magnet coil body is markedly reduced in comparison with a fixing strip consisting of a ferromagnetic material. The diamagnetic or paramagnetic material brings about an advantageously high magnetic holding force. The fixing strip therefore fulfills an advantageous dual function in that, on the one hand, it holds the magnet coil body on the attachment parts and, on the other hand, contributes to the avoidance of magnetic short circuits brought about thereby. As a result, no additional separating bodies including a diamagnetic or paramagnetic material are required.

Other aspects of the present disclosure will become apparent from the following descriptions when considered in conjunction with the accompanying drawings.

DETAILED DESCRIPTION

Figure 1:
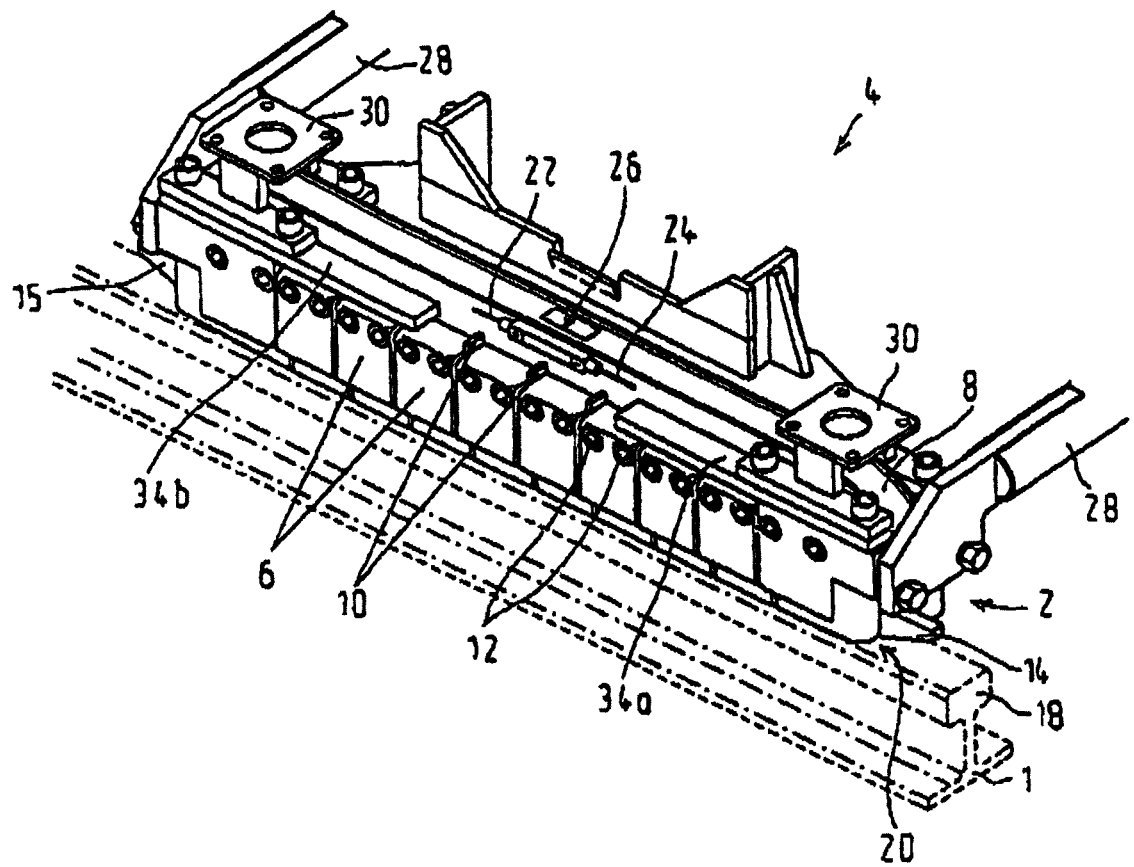
FIG. 1 shows a perspective side view of an embodiment of magnetic rail brake, according to the present disclosure, showing a braking magnet including a plurality of magnet elements.

In order to be able to better adapt to uneven sections of a rail 1, an embodiment of a braking magnet 2 of a magnetic rail brake 4 is shown in FIG. 1. A plurality of magnet elements 6 are provided instead of a single magnet. The magnet elements 6 are held such that they can move to a limited extent on a magnet coil body 8 extending in a longitudinal direction of the rail 1. This is achieved by the fact that the magnet elements 6 are suspended such that they can tip or pivot to a limited extent symmetrically with respect to a vertical central plane on side faces 38 (see FIG. 2), which point away from one another, of the magnet coil body 8 in chambers formed between partition walls 10, for example, by screw connections 12. The transmission of braking forces to the magnet coil body 8 takes place via the partition walls 10. End pieces 14, 15 are rigidly connected to the magnet coil body 8 and provide the braking magnet 2 with effective guidance over points and rail joints. The magnet coil body 8, which contains a magnet coil (not visible here), consequently bears or includes the magnet elements 6, which form a magnet core of the braking magnet 2.

The magnet elements 6 are fixed to the magnet coil body 8 such that their lower ends 16 facing the rail 1 protrude beyond the magnet coil body 8. As a result, the lower ends 16 form limbs and pole shoes, or north or south poles, of the braking magnet 2, which pole shoes run parallel to one another in cross section. An air gap 20 is provided between the pole shoes 16 and a rail head 18 of the rail 1.

Figure 2:
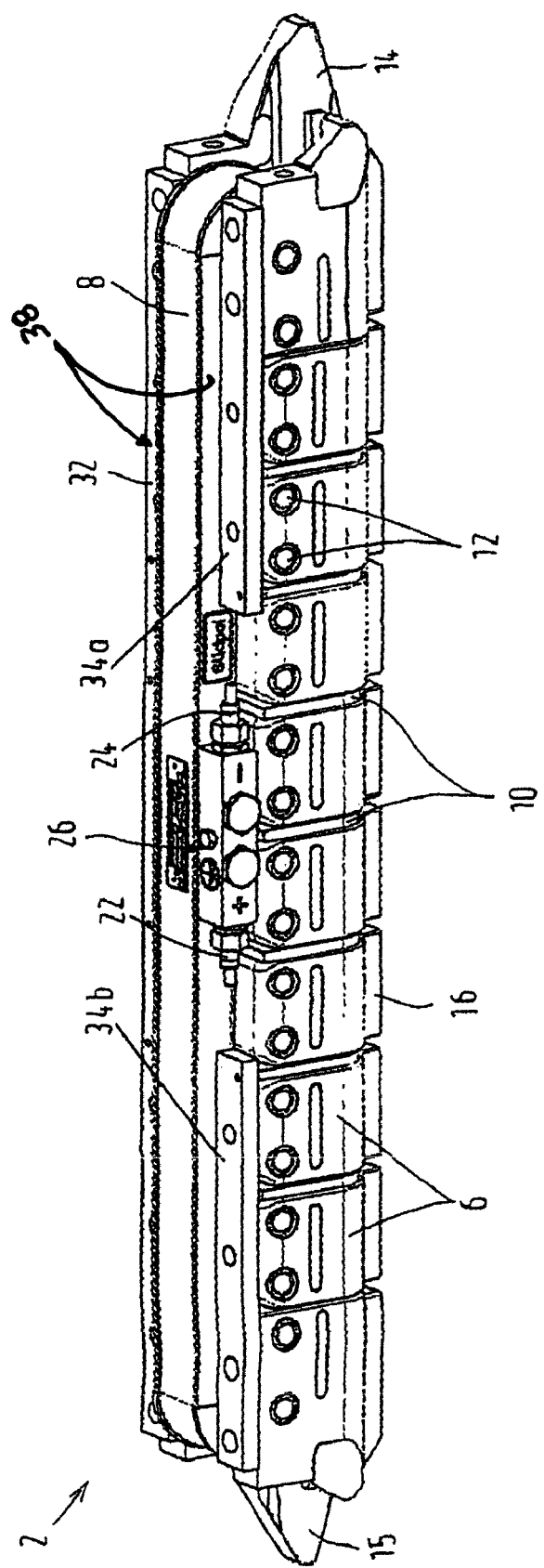
FIG. 2 shows a perspective side view of the braking magnet of FIG. 1.

As is best shown in FIG. 2, a connecting device 26 is provided in order to supply the magnet coil with electrical voltage. The connecting device 26 has at least two electrical connections 22, 24 for the positive and negative terminal of a voltage source and is arranged, for example, in an upper region of side face 38 (see FIG. 2) of the magnet coil body 8, approximately centrally with respect to its longitudinal extent or length. The electrical connections 22, 24 point away from one another and extend in the longitudinal direction of the magnet coil body 8.

When suspending the magnetic rail brake 4, two braking magnets 2, which are arranged symmetrically over the rails 1 and of which only one is shown in FIG. 1, are connected to track holders 28 to form a fixed brake square. The braking magnets 2 are mounted in the running gear via actuating cylinders, which are not shown in FIG. 1 for reasons of scale. Storage springs in the unpressurized actuating cylinders press the brake square into an upper position. The actuating cylinders are connected to associated braking magnets 2 via flanges 30.

Figure 3:
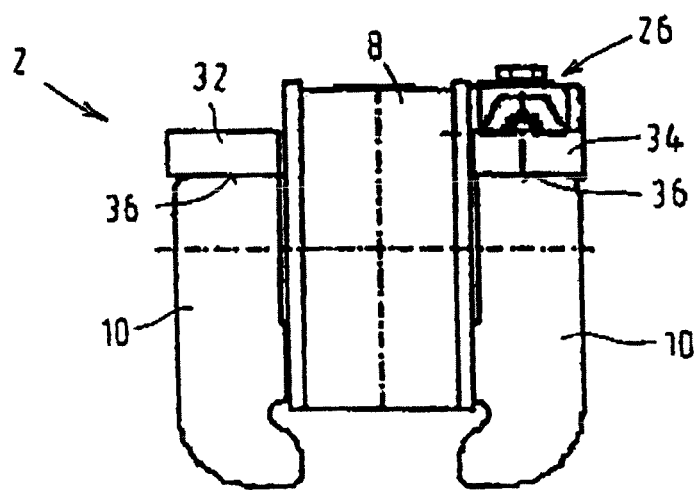
FIG. 3 shows a cross-sectional view of a magnet coil body of the magnetic rail brake of FIG. 1.

In order to fix the magnet coil body 8 to attachment parts of the magnetic rail brake 4, such as to the track holders 28 or to the flanges 30 of the actuating cylinders, fixing strips 32, 34, for example, are provided which run parallel to the longitudinal extent of the magnet coil body 8 and are connected directly to the magnet coil body 8. When viewed in the longitudinal extent of the magnet coil body 8, one fixing strip 32, 34 is arranged on one side face of the magnet coil body 8 directly above an upper front face 36 of the magnet elements 6 (see FIG. 3). In the process, one fixing strip 32 extends essentially from one end piece 14 to the other end piece 15 of the braking magnet 2, while the other fixing strip 34 is split into two parts, 34a, 34b, and the connecting device 26 is arranged between the two parts 34a and 34b (see FIG. 2). The two fixing strips 32, 34 are welded to the magnet coil body 8 and form a welded assembly together with the magnet coil body 8.

If a direct current flowing in the magnet coil now brings about a magnetic voltage, which generates a magnetic flux in the magnet core comprising the magnet elements 6, which magnetic flux is short-circuited via the rail head 18 as soon as the braking magnet 2 rests on the rail 1, magnetic short circuits may result owing to attachment parts such as the track holders 28 or the flanges 30. Such short circuits may reduce the holding force of the magnetic elements 6 on the rail 1.

According to the present disclosure, at least one of the fixing strips 32, 34 includes a diamagnetic or paramagnetic material. This results in the magnetic field being weakened or only slightly intensified such that the magnetic stray flux on the magnet coil body 8 is markedly reduced, which brings about an advantageously high magnetic holding force.

Although the present disclosure has been described and illustrated in detail, it is to be clearly understood that this is done by way of illustration and example only and is not to be taken by way of limitation. The scope of the present disclosure is to be limited only by the terms of the appended claims.

The invention claimed is:

1. A magnetic rail brake device of a rail vehicle, comprising:
    at least one braking magnet including a magnet coil body having a plurality of magnetic elements held thereon, which magnetic elements are movable;
    at least one fixing strip running parallel to a longitudinal length of the magnet coil body and directly connected to the magnet coil body to fix the braking magnet to other components of the magnetic rail brake device; and
    the at least one fixing strip including a diamagnetic material.

2. The magnetic rail brake device as claimed in claim 1, wherein, when viewed along the longitudinal length of the magnet coil body, the at least one fixing strip, which is essentially continuous from one end piece to another end piece of the magnet coil body, is arranged on a side face of the magnet coil body.

3. The magnetic rail brake device as claimed in claim 1, wherein the at least one fixing strip includes a first and a second fixing strip, the first fixing strip extends essentially continuously from one end piece to another end piece of the magnet coil body, and the second fixing strip is split into two parts, and a connecting device for a voltage source is arranged between the two parts of the second fixing strip.

4. The magnetic rail brake device as claimed in claim 1, wherein the at least one fixing strip forms a welded assembly with the magnet coil body.

5. The magnetic rail brake device as claimed in claim 1, wherein the at least one fixing strip is fixed detachably to one or more of flanges for actuating cylinders, track holders or other attachment parts of the magnetic rail brake.

6. A magnetic rail brake device of a rail vehicle, comprising:
    at least one braking magnet including a magnet coil body having a plurality of magnetic elements held thereon, which magnetic elements are movable;
    at least one fixing strip running parallel to a longitudinal length of the magnet coil body and directly connected to the magnet coil body to fix the braking magnet to other components of the magnetic rail brake device; and
    the at least one fixing strip including a paramagnetic material.

* * * * *